United States Patent
Seo et al.

(10) Patent No.: US 9,451,071 B2
(45) Date of Patent: Sep. 20, 2016

(54) MOBILE TERMINAL AND CONTROLLING METHOD THEREOF

(71) Applicant: LG ELECTRONICS INC., Seoul (KP)

(72) Inventors: Youngyeon Seo, Seoul (KR); Hokyun Kang, Seoul (KR); Jieun Kim, Seoul (KR); Minho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/596,956

(22) Filed: Jan. 14, 2015

(65) Prior Publication Data

US 2015/0281945 A1 Oct. 1, 2015

(30) Foreign Application Priority Data

Mar. 27, 2014 (KR) .................. 10-2014-0035929

(51) Int. Cl.
| | |
|---|---|
| *H04M 1/72* | (2006.01) |
| *H04M 1/725* | (2006.01) |
| *H04M 1/27* | (2006.01) |
| *H04M 1/57* | (2006.01) |
| *H04B 1/3827* | (2015.01) |

(52) U.S. Cl.
CPC ......... *H04M 1/72519* (2013.01); *H04M 1/271* (2013.01); *H04M 1/575* (2013.01); *H04M 1/7253* (2013.01); *H04B 2001/3861* (2013.01)

(58) Field of Classification Search
CPC ......... H04W 8/22; H04W 4/02; H04W 4/08; H04W 88/06; H04W 4/023; H04W 4/206; H04W 64/00; H04W 12/06; H04W 4/001; H04W 4/022; H04W 4/06; H04W 4/22; H04W 52/0225; H04W 84/02; H04W 84/027; H04B 2001/3861; H04M 1/271; H04M 1/575; H04M 1/72519; H04M 1/7253
See application file for complete search history.

(56) References Cited

U.S. PATENT DOCUMENTS

| | | | | |
|---|---|---|---|---|
| 2008/0070612 | A1* | 3/2008 | Weinans ............. | H04M 1/7253 455/517 |
| 2014/0189584 | A1* | 7/2014 | Weng ................. | G06F 3/04883 715/808 |
| 2014/0378185 | A1* | 12/2014 | Chung ................. | G06F 1/163 455/557 |
| 2015/0022438 | A1* | 1/2015 | Hong ................. | H04M 1/7253 345/156 |
| 2015/0026647 | A1* | 1/2015 | Park ..................... | G06F 3/0488 715/863 |
| 2015/0049591 | A1* | 2/2015 | Adams .................. | G04G 21/08 368/13 |
| 2015/0241689 | A1* | 8/2015 | Sakai .................. | G02B 26/005 359/290 |
| 2015/0242340 | A1* | 8/2015 | Ishikawa .................. | G06F 8/61 719/321 |
| 2015/0261315 | A1* | 9/2015 | Alameh .................... | G06F 3/03 345/156 |
| 2015/0264139 | A1* | 9/2015 | Son ..................... | H04L 67/1002 709/208 |
| 2015/0286813 | A1* | 10/2015 | Jakobsson .............. | G06F 21/35 726/9 |

* cited by examiner

*Primary Examiner* — Hirdepal Singh
(74) *Attorney, Agent, or Firm* — Birch, Stewart, Kolasch & Birch, LLP

(57) ABSTRACT

A mobile terminal and controlling method thereof are disclosed, by which various kinds of convenient functions can be provided in manner of interworking with a watch type mobile terminal. The mobile terminal includes a wireless communication unit configured to exchange signals with a watch type mobile terminal and a controller, if a first signal is received from a watch type mobile terminal while executing a first function by the mobile terminal, transmitting information related to the first function to the watch type mobile terminal in order for the information related to the first function to be output from the watch type mobile terminal.

16 Claims, 19 Drawing Sheets

FIG. 10
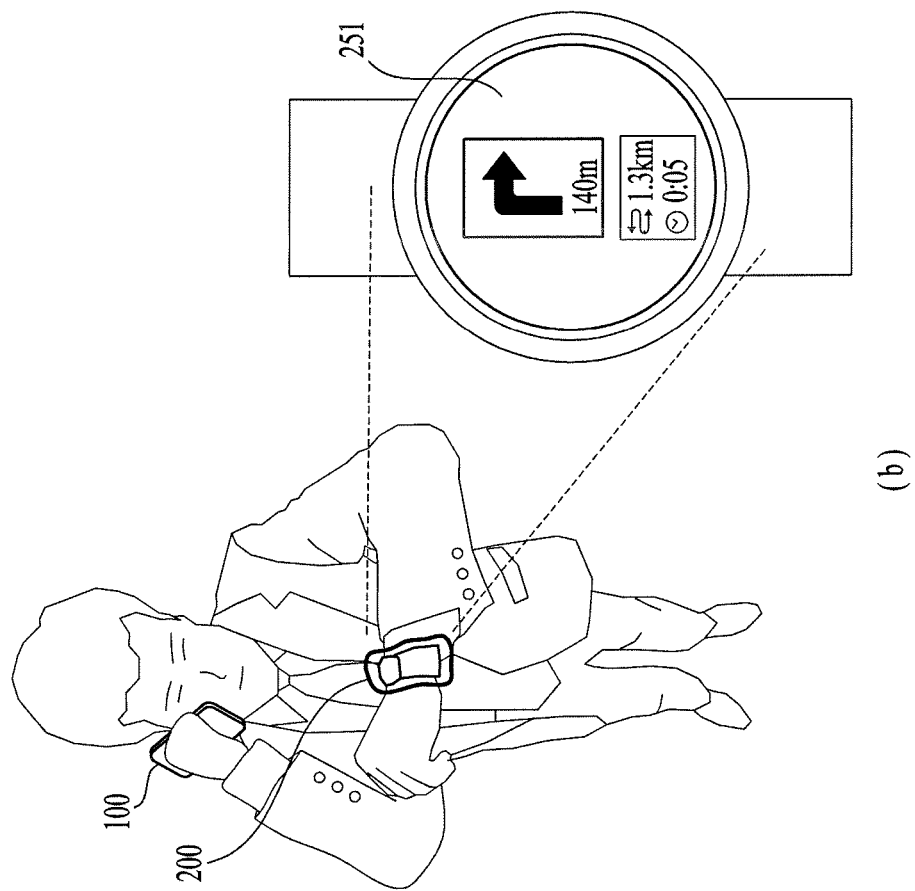
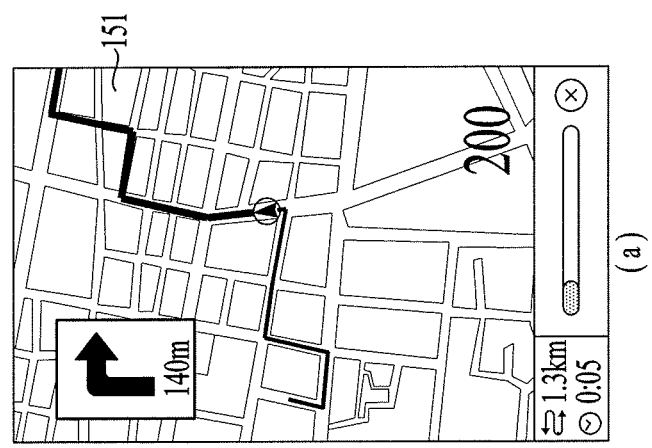

(a)     (b)

(a)        (b)

(a)        (b)

MOBILE TERMINAL AND CONTROLLING METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2014-0035929, filed in the Republic of Korea on Mar. 27, 2014, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for providing various kinds of convenient functions by interworking with a watch type mobile terminal.

2. Discussion of the Related Art

Generally, terminals can be classified into mobile/portable terminals and stationary terminals. The mobile terminals can be further classified into handheld terminals and vehicle mounted terminals. As functions of terminals are becoming more diversified, terminals tend to be implemented as a multimedia players provided with composite functions such as photographing of photos or videos, playback of music or video files, game play, broadcast reception and the like for example.

Recently, such a mobile terminal as a smartphone and the like tends to interwork with wearable devices of various types. As an example of a wearable device, there is a mobile terminal of a watch type. However, functions of the watch type mobile terminal are limited to simply playing a role as a relay with an input/output means for only performing partial functions of the mobile terminal.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which more convenient functions can be provided by interworking with a watch type mobile terminal.

In particular, one object of the present invention is to provide a mobile terminal and controlling method thereof, by which necessary information can be checked through a watch type mobile terminal in a situation that a user has difficulty in checking a touchscreen of the mobile terminal.

Technical tasks obtainable from the present invention are non-limited by the above-mentioned technical tasks. In addition, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to one embodiment of the present invention may include a wireless communication unit configured to exchange signals with a watch type mobile terminal and a controller, if a first signal is received from a watch type mobile terminal in the course of executing a first function, transmitting an information related to the first function to the watch type mobile terminal in order for the information related to the first function to be output from the watch type mobile terminal.

In another aspect of the present invention, as embodied and broadly described herein, a method of controlling a mobile terminal according to one embodiment of the present invention may include the steps of executing a first function and if a first signal is received from a watch type mobile terminal in the course of executing the first function, transmitting an information related to the first function to the watch type mobile terminal in order for the information related to the first function to be output from the watch type mobile terminal.

In another aspect of the present invention, as embodied and broadly described herein, a mobile terminal according to another embodiment of the present invention may include a wireless communication unit configured to exchange wireless signals by being paired with a watch type mobile terminal and a controller, if a call is initiated, transmitting a first signal indicating that the voice call is initiated to the watch type mobile terminal, the controller, if receiving a user voice input through a microphone of the watch type mobile terminal, extracting target information from the user's voice and then saving the extracted target information as saved information corresponding to a specific application, the controller, if a preset condition is met, controlling a second signal to be transmitted to the watch type mobile terminal in order for a notification of the saved information to be output from the watch type mobile terminal.

In another aspect of the present invention, as embodied and broadly described herein, a method of controlling a mobile terminal according to another embodiment of the present invention may include the steps of being paired with a watch type mobile terminal, if a call is initiated, transmitting a first signal indicating that the voice call is initiated to the watch type mobile terminal, extracting a target information from a user voice input through a microphone of the watch type mobile terminal, saving the extracted target information as an information corresponding to a specific application, and if a preset condition is met, transmitting a second signal to the watch type mobile terminal in order for a notification of the saved information to be output from the watch type mobile terminal.

In another aspect of the present invention, as embodied and broadly described herein, a watch type mobile terminal according to another embodiment of the present invention may include a wireless communication unit configured to exchange wireless signals with the mobile terminal by being paired with the mobile terminal, a display, a microphone configured to receive an input of a user's voice, and a controller configured to receive a first signal indicating that a call is initiated in the mobile terminal through the wireless communication, determine whether a voice recognition condition is met, transmit a voice input through the microphone to the mobile terminal if the voice recognition condition is met, and determine if a second signal is received from the mobile terminal and controlling a notification information corresponding to the second signal to be output through the display.

Effects obtainable from the present invention may be non-limited by the above mentioned effect. In addition, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 10 is a diagram illustrating one example of a process for an interrupted function in a mobile terminal to be continued in a watch type mobile terminal according to one embodiment of the present invention;

DETAILED DESCRIPTION OF THE INVENTION

Description will now be given in detail according to embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and the embodiments presented herein are not limited by the accompanying drawings. As such, the present invention should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
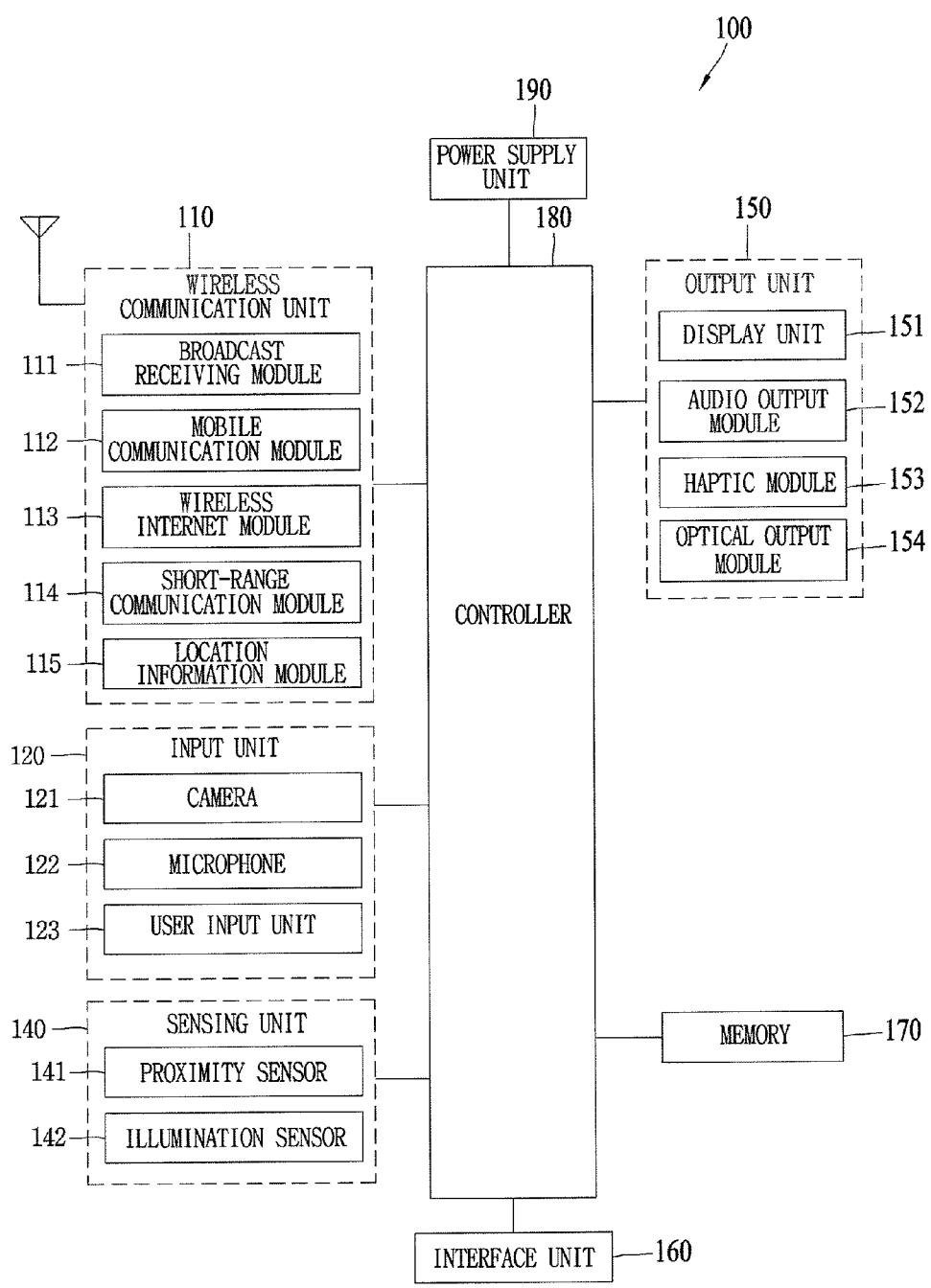
FIG. 1 is a block diagram describing a mobile terminal related to the present invention.
Figure 2A:
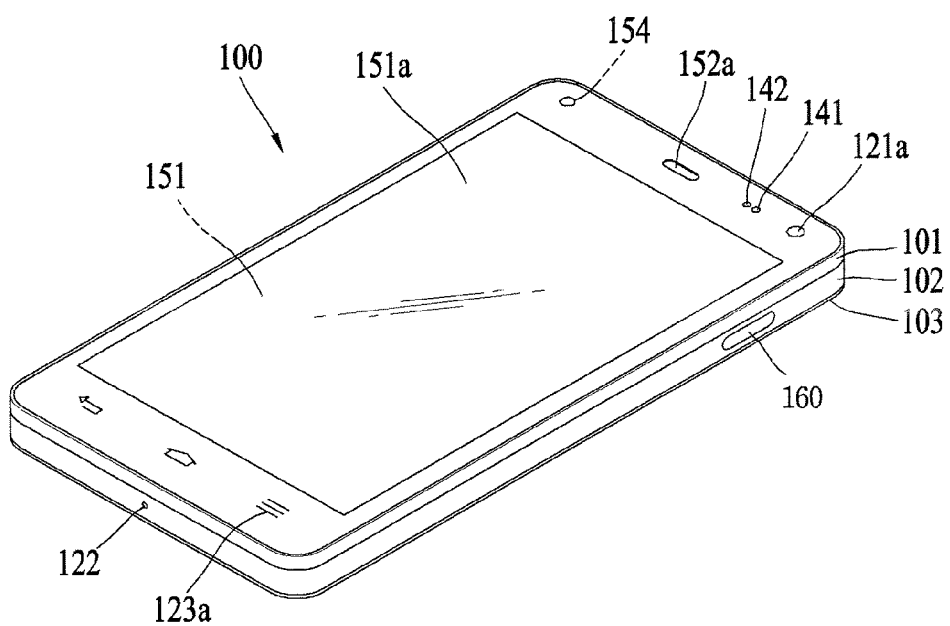
FIG. 2A and FIG. 2B are perspective diagrams illustrating one example of a mobile terminal related to the present invention in different views.
Figure 2B:
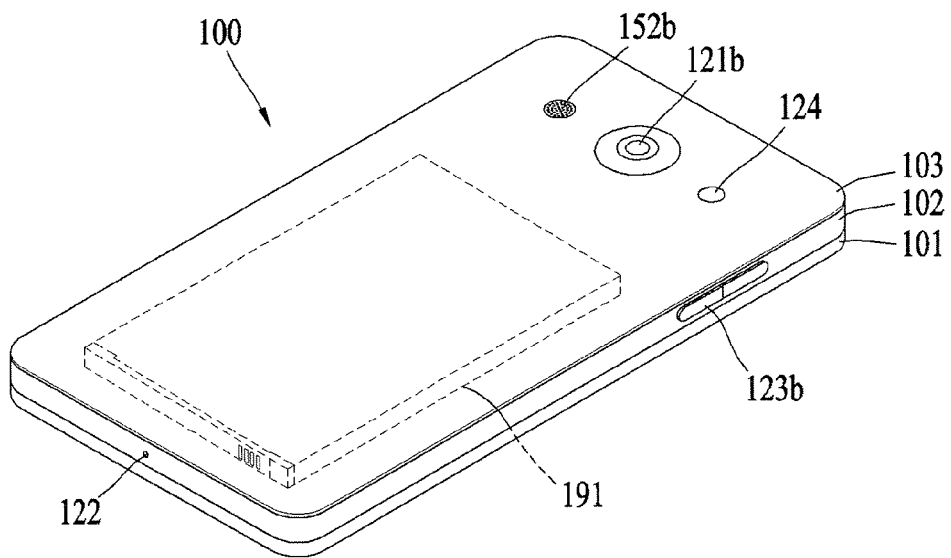

Reference is now made to FIGS. 1-2B, where FIG. 1 is a block diagram of a mobile terminal in accordance with the present invention, and FIGS. 2A and 2B are conceptual views of one example of the mobile terminal, viewed from different directions.

According to an embodiment of the present invention, various functions are provided through linked operations between a mobile terminal and a wearable device. Therefore, a configuration of a watch type wearable device is described as one example of a wearable device to which the present invention is applicable.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1-2B according to the execution of an application program that has been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this instance, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise canceling algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense the presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any one of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type touch screen, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executing application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and convert it into a left image and a right image.

The audio output module 152 is generally configured to output audio data. Such audio data may be obtained from a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light from a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data from the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating use of the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provides internal power and supplies the appropriate power required for operating respective elements and components included in the mobile terminal 100. The power supply unit 190 may include a battery, which is typically rechargeable or be detachably coupled to the terminal body for charging. The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 2A and 2B, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 2A and 2B depict certain components as arranged on the mobile terminal. However, it is to be understood that alternative arrangements are possible and within the teachings of the instant invention. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1). Therefore, the touch screen may replace at least some of the functions of the first manipulation unit 123a. The first audio output module 152a may be implemented in the form of a speaker to output voice audio, alarm sounds, multimedia audio reproduction, and the like. The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 2A illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 2B, a flash 124 is shown adjacent to the second camera 121b. When an image of a subject is captured with the camera 121b, the flash 124 may illuminate the subject. As shown in FIG. 2B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

The present invention provides various functions through a mutual interworking operation between a mobile terminal and a watch type mobile terminal mentioned in the foregoing description. Configurations of a watch type mobile terminal applicable to the present invention are described in detail as follows.

Figure 3:
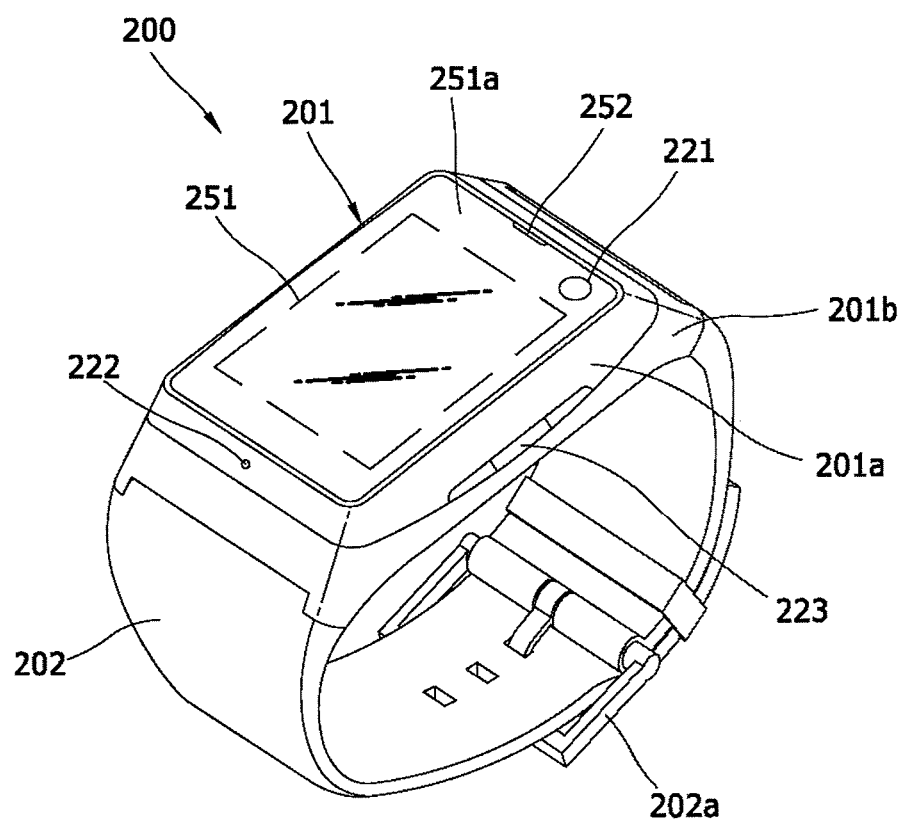
FIG. 3 is a perspective diagram illustrating one example of a watch type mobile terminal related to another embodiment of the present invention.

FIG. 3 is a perspective view illustrating a watch-type mobile terminal 200 as one example a wearable device in accordance with embodiments of the present invention. As illustrated in FIG. 3, the watch-type mobile terminal 200 includes a main body 201 with a display unit 251 and a band 202 connected to the main body 201 to be wearable on a wrist.

The main body 201 may include a case having a certain appearance. As illustrated, the case may include a first case 201a and a second case 201b cooperatively defining an inner space for accommodating various electronic components. Other configurations are possible. For instance, a single case may alternatively be implemented, with such a case being configured to define the inner space, thereby implementing a mobile terminal 200 with a uni-body. In this instance, various electrical/electronic parts included in the case can be configured to perform at least the same or similar functions of the respective components described with reference to FIGS. 1-2B. For instance, a controller is provided to a watch type mobile terminal. In addition, a wireless communication unit, an interface unit, a memory and the like can be further provided to the watch type mobile terminal if necessary.

The watch-type mobile terminal 200 can perform wireless communication, and an antenna for the wireless communication can be installed in the main body 201. The antenna may extend its function using the case. For example, a case including a conductive material may be electrically connected to the antenna to extend a ground area or a radiation area.

The display unit 251 is shown located at the front side of the main body 201 so that displayed information is viewable to a user. In some embodiments, the display unit 251 includes a touch sensor so that the display unit can function as a touch screen. As illustrated, window 251a is positioned on the first case 201a to form a front surface of the terminal body together with the first case 201a.

The illustrated embodiment includes audio output module 252, a camera 221, a microphone 222, and a user input unit 223 positioned on the main body 201. When the display unit 251 is implemented as a touch screen, additional function keys may be minimized or eliminated. For example, when the touch screen is implemented, the user input unit 223 may be omitted.

The band 202 is commonly worn on the user's wrist and may be made of a flexible material for facilitating wearing of the device. As one example, the band 202 may be made of fur, rubber, silicon, synthetic resin, or the like. The band 202 may also be configured to be detachable from the main body 201. Accordingly, the band 202 may be replaceable with various types of bands according to a user's preference.

In one configuration, the band 202 may be used for extending the performance of the antenna. For example, the band may include therein a ground extending portion electrically connected to the antenna to extend a ground area. The band 202 may include fastener 202a. The fastener 202a may be implemented into a buckle type, a snap-fit hook structure, a Velcro® type, or the like, and include a flexible section or material. The drawing illustrates an example that the fastener 202a is implemented using a buckle.

Moreover, a wearable device of a watch type is provided with a controller configured to control the respective components configuring the wearable device and to perform decision and processing on each function mentioned in the following description. Besides, the present invention is applicable to wearable devices of various types including a bracelet type, a glasses type, a necklace type and the like as well as to a wearable device of a watch type. In this instance, configurations of the components shown in FIG. 3 can be modified to fit wearable shapes.

Also, assume that the mobile terminal 100 according to an embodiment of the present invention includes at least one of the components shown in FIGS. 1 to 2B. In particular, the mobile terminal 100 according to an embodiment of the present invention can be assumed as including the wireless communication unit 110, the sensing unit 140, the display unit 151 and the controller 180.

Meanwhile, such a graphic for pointing at a specific object on a display unit or selecting a menu from the display unit as an arrow, a finger and the like is called a pointer or a cursor. However, the pointer is frequently used to mean a finger, a stylus pen or the like for a touch manipulation and the like. In order to clearly discriminate the pointer and the cursor from each other in this description mechanism, a graphic displayed on a display unit is named a cursor and such a physical for performing a touch, a proximity touch, a gesture and the like as a finger, a stylus pen and the like is named a pointer.

Moreover, the mobile terminal is connected to the watch type mobile terminal through a short range communication such as Bluetooth and the like, wireless internet or the like and can then perform a data exchange for performing an interworking function described later. Each function mentioned in the following description can be activated through at least one application. In particular, at least two applications can be run together in order to activate a single function or a corresponding function can be performed through a single application.

Function of Interworking Between Mobile Terminal and Watch Type Mobile Terminal

According to one embodiment of the present invention, a mobile terminal and controlling method thereof are provided to provide more convenient functions in a manner that the mobile terminal interworks with a watch type mobile terminal. Moreover, according to one embodiment of the present invention, a mobile terminal and controlling method thereof are provided, in which a user having difficulty in checking a touchscreen of the mobile terminal can check necessary information through a watch type mobile terminal.

Generally, while a user is making a phone call to a counterpart, if the user intends to apply a schedule input for making an appointment with the counterpart or the like, the user manipulates a touchscreen of a mobile terminal by placing the call on hold. Alternatively, the user memorizes the schedule and then inputs the schedule after an end of the call. Thus, the demand is increasing for a method of facilitating an appointment with a call counterpart to be recorded without interrupting the call. Therefore, the present embodiment proposes a method as follows. First of all, a content to be recorded is input through a watch type mobile terminal in the course of making a phone call. Second, the input content is saved as information of a specific type. Finally, a user can check the saved information. Thereafter, if a saved schedule event/item approaches, a menu (phone/text sending/location sending) of a shortcut to a corresponding counterpart can be instantly provided together with an alarm.

Details of the above description are explained with reference to FIG. 4 as follows. In particular, FIG. 4 is a flowchart illustrating one example of a process for saving audio information through a watch type mobile terminal and outputting notification information in the course of performing a call using a mobile terminal according to one embodiment of the present invention.

Figure 4:
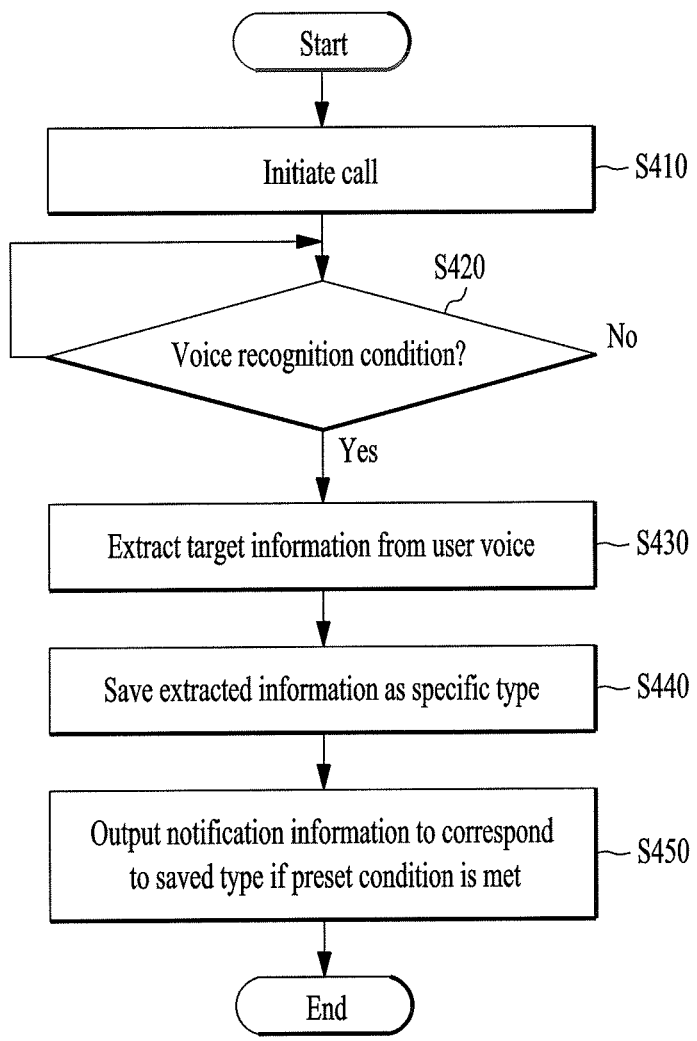
FIG. 4 is a flowchart illustrating one example of a process for saving audio information through a watch type mobile terminal and outputting notification information in the course of performing a call using a mobile terminal according to one embodiment of the present invention.

Referring to FIG. 4, a phone call can be initiated through the mobile terminal 100 (S410). The controller 180 can determine whether a preset voice recognition condition is met in the course of the phone call (S420). In this instance, the voice recognition condition may be a condition for activating a function of saving information corresponding to a voice input through the microphone 122 of the watch type mobile terminal 200. In order to determine the present condition, the controller 180 of the mobile terminal 100 informs the watch type mobile terminal 200 that the phone call is initiated so that the watch type mobile terminal 200 can prepare to receive an input of a user's voice. As examples of this condition, there may exist a case of detecting a motion of a preset type through a sensor (e.g., an acceleration sensor, a gyro sensor, etc.) configured to determine a motion of the watch type mobile terminal 200, a case of manipulating a specific key button in the mobile terminal 100 or the watch type mobile terminal 200, a case of recognizing a specific voice through the microphone 122 of the mobile terminal 100, a case of recognizing a user's face through the camera 221 of the watch type mobile terminal 200, and the like, by which the condition is non-limited. Meanwhile, the microphone 222 of the watch type mobile terminal 200 may be turned on when the information indicating that the phone call is initiated is received from the mobile terminal 100. Alternatively, the microphone 222 of the watch type mobile terminal 200 may be turned on if the voice recognition condition is met. If the voice recognition condition is met in the mobile terminal 100, the controller 180 can inform the watch type mobile terminal 200 that the voice recognition condition is met.

Once the voice recognition condition is met, target information can be extracted from the voice input through the microphone 222 of the watch type mobile terminal 200 (S430). In this instance, the target information may include a time, a place, a person's name and the like. The target information extraction may be performed by the watch type mobile terminal 200. Alternatively, as the watch type mobile terminal 200 transmits an audio signal input by a user to the mobile terminal 100, the target information can be extracted through the mobile terminal 100.

The extracted information can be saved as information of a specific type in accordance with a predetermined setup value or a user's selection (S440). In this instance, the type can be categorized depending on whether such information as a simple text memo, a schedule item and the like is saved through a prescribed application. In instance, when the extracted information is saved as a memo, the extracted information becomes the information of a text type that can be confirmed through a memo application. For another instance, when the extracted information is saved as a schedule event/item, the extracted information is saved as a schedule item manageable through a schedule application.

Thereafter, if a preset condition is met, a notification information corresponding to the saved type can be output through the watch type mobile terminal 200 (S450). In this instance, the preset condition may include one of a case that the saved type is a schedule information, a case that 30 minutes is left until a time saved in a schedule expires, a case of approaching a place saved in a schedule within a predetermined distance, and the like. An output configuration of the notification information shall be described later.

Figure 5:
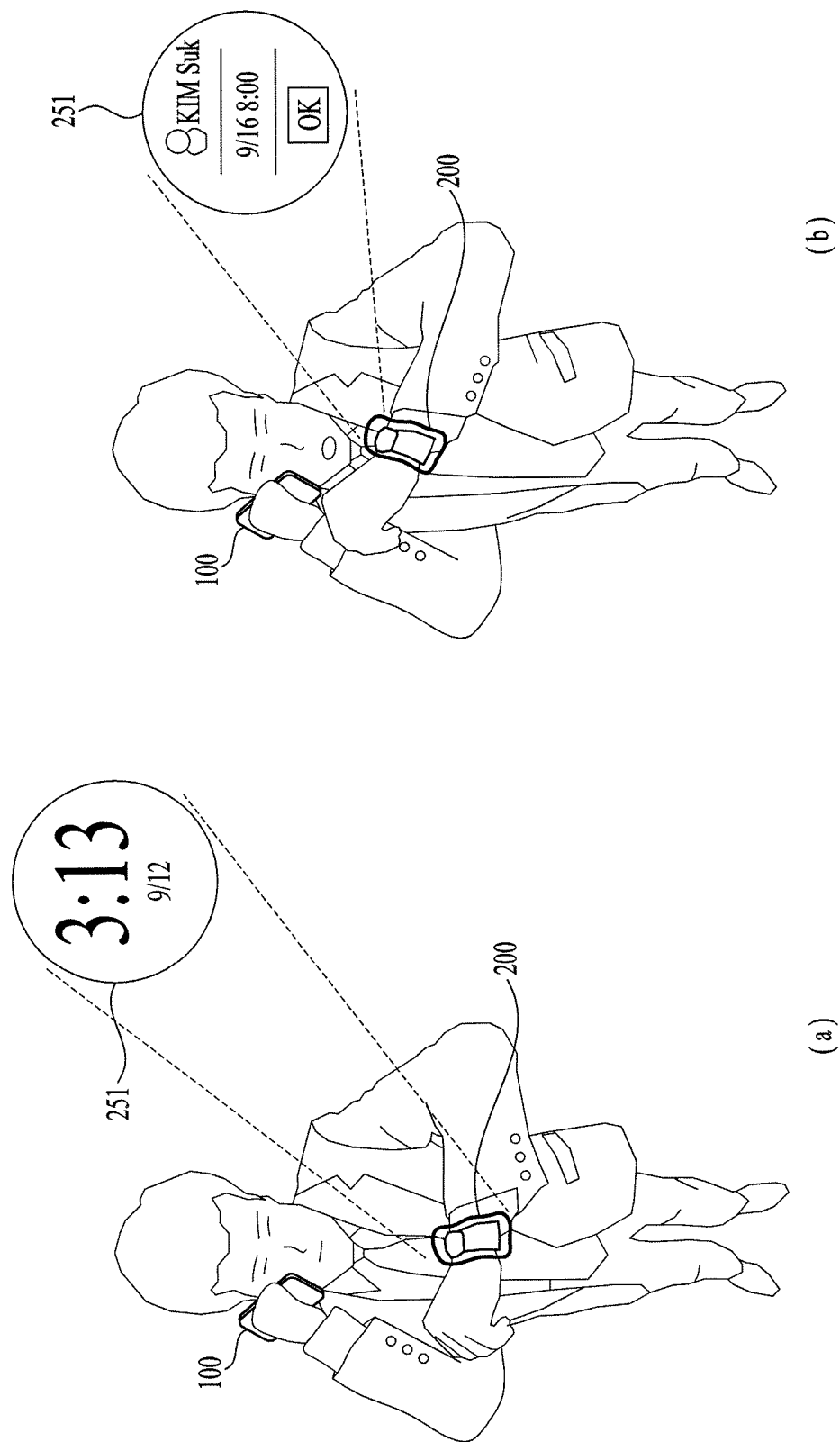
FIG. 5 is a diagram illustrating one example of a process for saving information as audio through a watch type mobile terminal in the course of performing a call using a mobile terminal according to one embodiment of the present invention.

FIG. 5 is a diagram illustrating one example of a process for saving audio information through a watch type mobile terminal while performing a call using a mobile terminal according to one embodiment of the present invention. In FIG. 5, assume that a voice recognition condition includes a motion corresponding to a user's action of lifting a wrist in front of a face being detected by the watch type mobile terminal.

Referring to FIG. 5 (a), a user is making a phone call to a counterpart through a mobile terminal 100. Further, while a voice recognition condition is not met, only a default information (e.g., a time information) is displayed on a touchscreen 251 of a watch type mobile terminal 200. In the course of the phone call, if there is an information a user intends to save, referring to FIG. 5 (b), the user can lift a wrist towards his or her face. Hence, if the watch type mobile terminal 200 recognizes the user's motion and then determines that the voice recognition condition is met, then the watch type mobile terminal 200 can activate a microphone, extract target information from a user's voice input through the microphone, and is then able to display the extracted information through the touchscreen 251. Referring to FIG. 5 (b), a counterpart, date and hour of a schedule event/item are illustrated as the recognized information. In this instance, the counterpart can be automatically input as a currently called counterpart unless a separate mention is made from the user.

Yet, if the watch type mobile terminal 200 approaches close to the user's face, as shown in FIG. 5 (b), a voice supposed to be input through the watch type mobile terminal 200 is also input to the microphone 122 of the mobile terminal 100, an unnatural situation may occur. Hence, a specific voice input (e.g., 'hold on', 'memo, please', etc.) is input through the microphone 222 of the watch type mobile terminal 200, the watch type mobile terminal 200 can request the mobile terminal 100 to deactivate the microphone 122 until a signal, which indicates that the voice recognition is completed, is delivered from the watch type mobile terminal 200. If there is no voice input from the user for a prescribed duration or a specific voice (e.g., 'O.K.', 'Complete', 'End', etc.) is recognized, the watch type mobile terminal 200 can determine that the voice recognition is completed.

Figure 6:
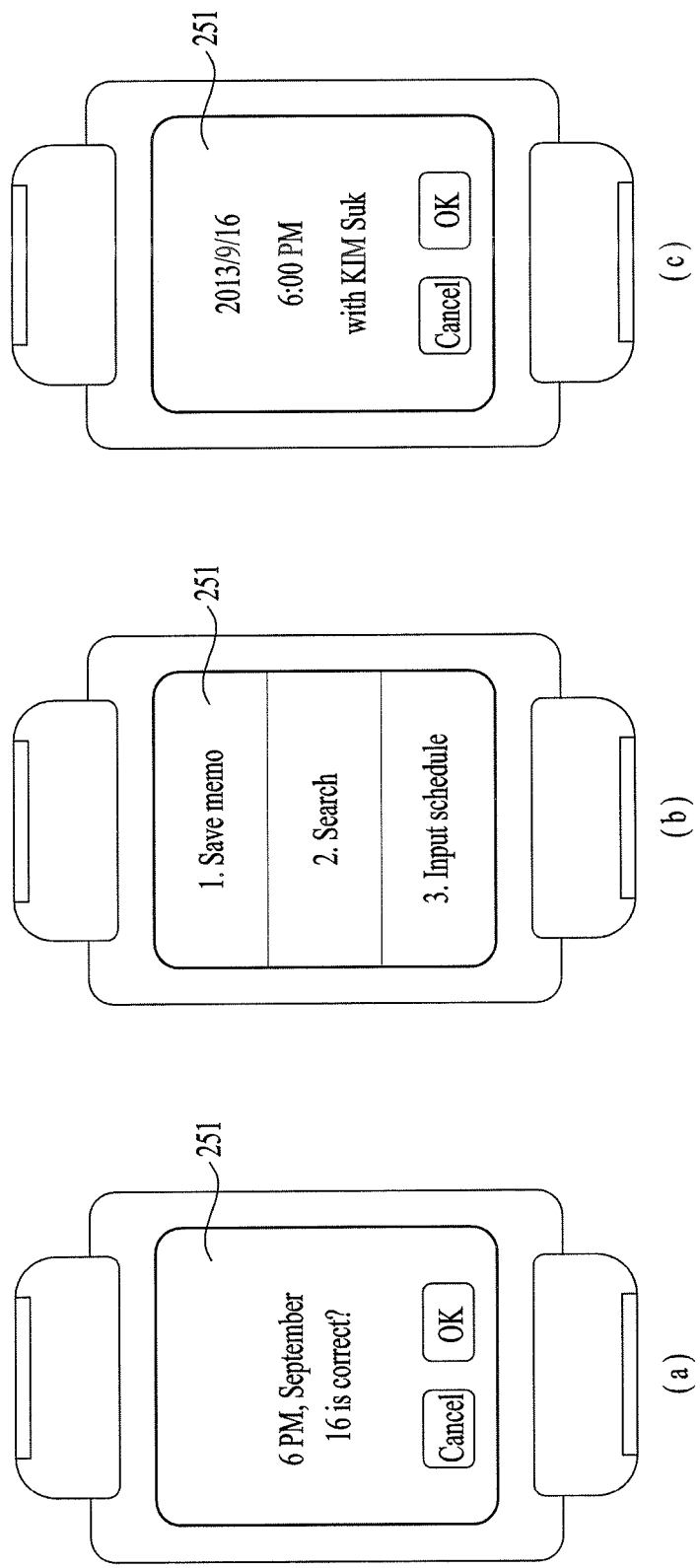
FIG. 6 is a diagram illustrating one example of a process for displaying and saving extracted target information in a watch type mobile terminal according to one embodiment of the present invention.

FIG. 6 is a diagram illustrating one example of a process for displaying and saving an extracted target information in a watch type mobile terminal according to one embodiment of the present invention. Referring to FIG. 6 (a), as a voice recognition is completed in a watch type mobile terminal, a screen for confirming a recognition result can be displayed on a touchscreen 251. This screen may be displayed in accordance with completion of the voice recognition despite the fact that a call has not ended. Alternatively, this screen may be displayed after an end of the call. If a user confirms the corresponding content, referring to FIG. 6 (b), a screen for enabling a user to select a prescribed type for saving the recognized content (i.e., an extracted target information) can be displayed. If information related to the weather or time does not exist in the recognized information, a schedule input menu may not be displayed. Further, if a 'memo save' menu is selected, the recognized content can be saved as a memo. If a 'search' menu is selected, a search result using the recognized substance as a keyword can be displayed through a touchscreen of the mobile terminal 100. Moreover, if a 'schedule input' menu is selected, referring to FIG. 6 (c), schedule information may be added with the recognized content and a screen for a final confirmation from a user can be displayed on the touchscreen 251.

Yet, when a type is selected, the mobile terminal is gripped with one hand of a user and the watch type mobile terminal is worn on the other hand. Hence, manipulation of the touchscreen 251 may be difficult. Hence, the type selection can be performed in response to a gesture (e.g., a swinging direction of the watch type mobile terminal, a swinging pattern of the watch type mobile terminal, etc.) recognized through the watch type mobile terminal.

In the following description, a process for outputting a notification in accordance with a saved schedule information is explained in detail with reference to FIGS. 7 to 9. In particular, FIG. 7 is a diagram illustrating one example of a process for outputting a notification in accordance with saved schedule information through a watch type mobile terminal according to one embodiment of the present invention.

Figure 7:
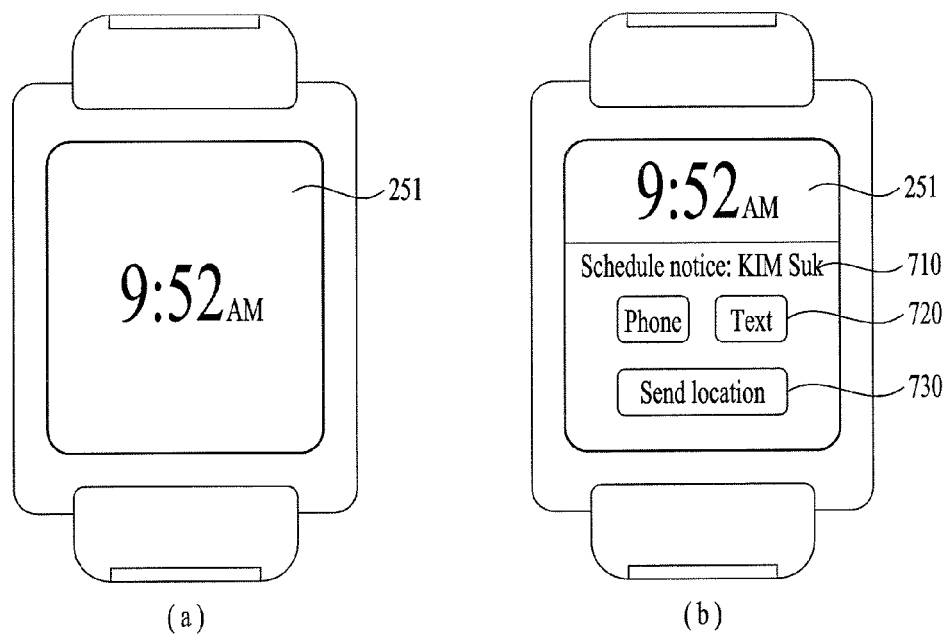
FIG. 7 is a diagram illustrating one example of a process for outputting a notification in accordance with saved schedule information by a watch type mobile terminal according to one embodiment of the present invention.

In FIG. 7, assume that a schedule event for a counterpart is saved in the course of making a phone call to the counterpart by one of the methods mentioned in the foregoing description. Referring to FIG. 7 (a), a watch of a digital type is displayed as one type of default information through a touchscreen 251 of a watch type mobile terminal. Further, if a schedule event/item is imminent (e.g., 30 minutes before a schedule event, etc.), referring to FIG. 7 (b), counterpart information 710 included in schedule information, a shortcut menu 720 to a contact means for contacting a counterpart, a menu 730 for sending a current location of a user to a counterpart and the like can be displayed on the touchscreen 251. The information shown in FIG. 7 (b) may be displayed if a schedule is imminent. The information shown in FIG. 7 (b) may be displayed if a user's motion of bringing the watch type mobile terminal closer to the user's face is detected by the watch type mobile terminal.

Figure 8:
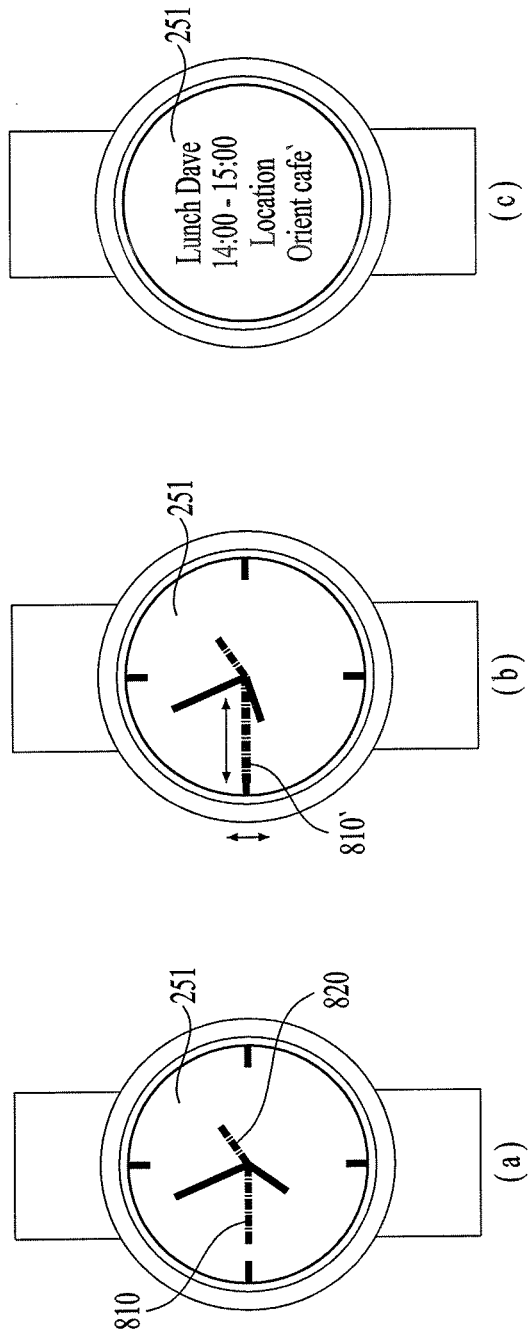
FIG. 8 is a diagram illustrating a process for outputting a notification in accordance with saved schedule information by a watch type mobile terminal according to one embodiment of the present invention.

FIG. 8 is a diagram illustrating another example of a process for outputting a notification in accordance with saved schedule information through a watch type mobile terminal according to one embodiment of the present invention. In FIG. 8, assume that a watch of an analog type including an hour hand and a minute hand is displayed on a touchscreen 251 of a watch type mobile terminal.

Referring to FIG. 8 (a), hands 810 and 820 corresponding to a saved schedule time can be displayed on a dial together with an hour hand and a minute hand. In particular, the hands corresponding to a schedule event can be displayed only if the schedule event exists on a corresponding day. In addition, the hands can be displayed by differentiating color, thickness and length depending on a significance of the schedule event. For instance, if the significance of a 9 o'clock schedule event is higher than that of a 2 o'clock schedule event, the hand 810 corresponding to the 9 o'clock schedule can be displayer longer than that of the other.

If a schedule event approaches, referring to FIG. 8 (b), a hand 810' corresponding to a schedule event can be displayed longer and thicker. Moreover, if a user intends to check a schedule contents, the user can touch a hand corresponding to a check-desired schedule, e.g., the hand 820 corresponding to the 2 o'clock schedule. Hence, referring to FIG. 8 (c), detailed information on the schedule can be displayed on the touchscreen.

Figure 9:
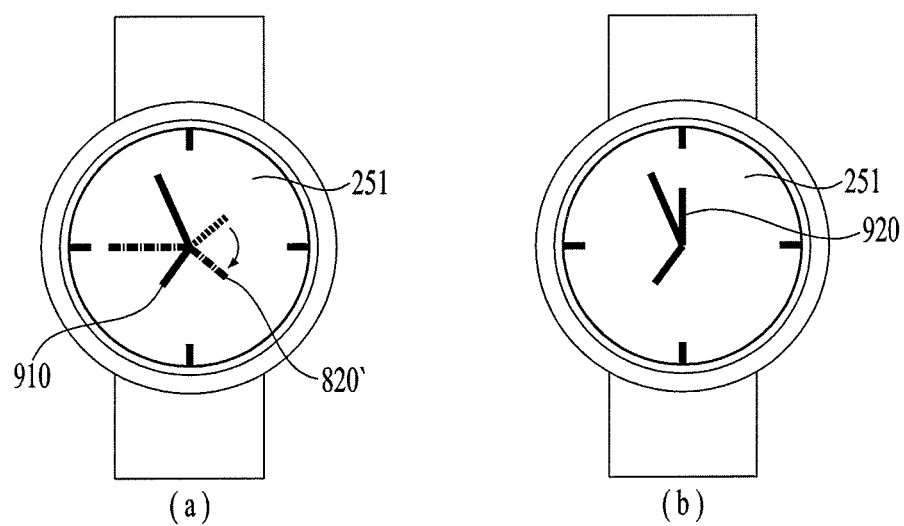
FIG. 9 is a diagram illustrating one example of a process for changing or adding saved schedule information by a watch type mobile terminal according to one embodiment of the present invention.

FIG. 9 is a diagram illustrating one example of a process for changing or adding a saved schedule information through a watch type mobile terminal according to one embodiment of the present invention. Referring to FIG. 9 (a), if a user intends to defer a schedule event, which is supposed to start on 2 o'clock, for 2 hours, the user selects a hand 820' corresponding to the schedule (e.g., a long touch input) and can then drag a position corresponding to a change-desired hour. Hence, the changed hour can be reflected by a schedule application. Further, in order to facilitate a hand movement, whenever the hand corresponding to the schedule passes through an hour indicator on a dial, vibration or voice announcement can be output from the watch type mobile terminal.

When an analog watch is displayed through the watch type mobile terminal, if a user intends to set a new schedule or alarm hour, the user can touch an hour hand 910 of a watch screen twice within a prescribed time or can long touch the hour hand 910. If so, referring to FIG. 9 (*b*), a hand 920 corresponding to the new schedule item can be displayed. The user can then add a new alarm by dragging the new hand 920 to a desired hour.

Meanwhile, while a random function is running on a mobile terminal, a current job may be interrupted due to an unintended or unanticipated event occurrence by a user or the like. In this instance, according to one embodiment of the present invention, a previous job can be resumed through a watch type mobile terminal. This is described in detail with reference to FIG. 10 and FIG. 11 as follows.

FIG. 10 is a diagram illustrating one example of a process for an interrupted function in a mobile terminal to be continued in a watch type mobile terminal according to one embodiment of the present invention. Referring to FIG. 10 (*a*), as a navigation function is activated in a mobile terminal, a map and route information are displayed on a touchscreen 151. Further, if there is an incoming call, the navigation function is paused and a call related UI is displayed on the touchscreen. In this instance, referring to FIG. 10 (*b*), route information in a schematic configuration can be displayed on a touchscreen 251 of a watch type mobile terminal 200. As a call is initiated, this function can be automatically executed if information (signal), which indicates that the call is initiated, is delivered to the watch type mobile terminal from the mobile terminal. This function can be executed if a user makes a gesture of lifting the watch type mobile terminal or if a user's face is recognized by the camera 221 of the watch type mobile terminal together with the gesture. Such a function may be executed if there is another incoming call in the course of making a current call.

Figure 11:
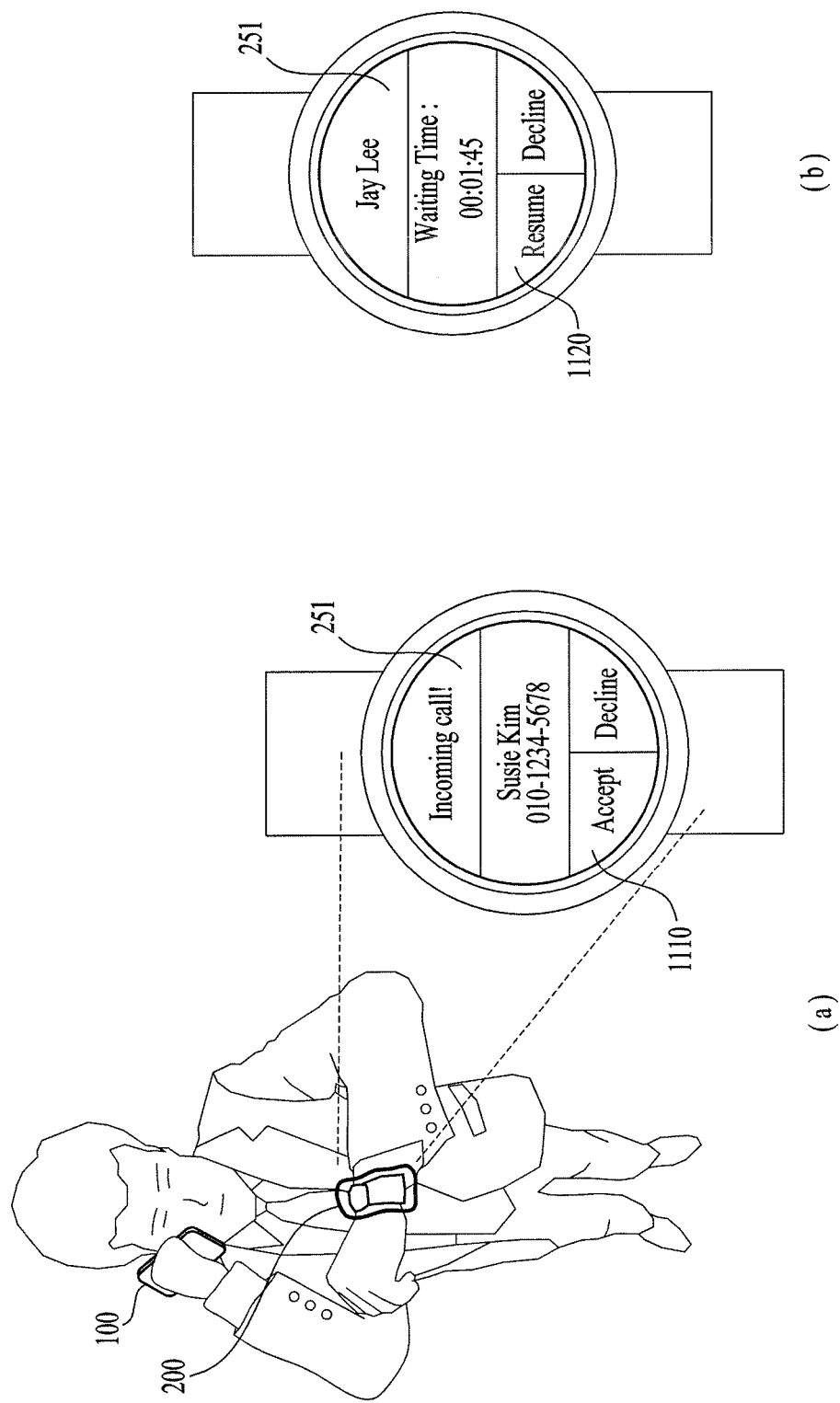
FIG. 11 is a diagram illustrating a process for an interrupted function in a mobile terminal to be continued in a watch type mobile terminal according to one embodiment of the present invention.

FIG. 11 is a diagram illustrating another example of a process for a function interrupted in a mobile terminal to be continued in a watch type mobile terminal according to one embodiment of the present invention. Referring to FIG. 11, while a user is making a phone call to a counterpart through a mobile terminal, it may happen that there is an incoming call from a different counterpart. If so, the user can check the different counterpart by looking at a touchscreen after detaching the mobile terminal from an ear. In order to prevent this inconvenience, referring to FIG. 11 (*a*), if there is an incoming call from a different counterpart in the course of making a phone call, information of the different counterpart and a menu 1110 for accepting or declining the incoming call can be displayed on a touchscreen 251 of a watch type mobile terminal. If the incoming call from the different counterpart is accepted, referring to FIG. 11 (*b*), an information of a previously called user and a standby time can be displayed on the touchscreen 251 of the watch type mobile terminal. The user interrupts the call to the different user and then resumes the call to the previous counterpart using a resume menu 1120.

In the following description, an example of using a watch type mobile terminal of the present invention as an auxiliary display is explained in detail with reference to FIGS. 12 to 15. In particular, FIG. 12 is a diagram illustrating one example of a process for performing a clipboard list function in a watch type mobile terminal according to one embodiment of the present invention.

Figure 12:
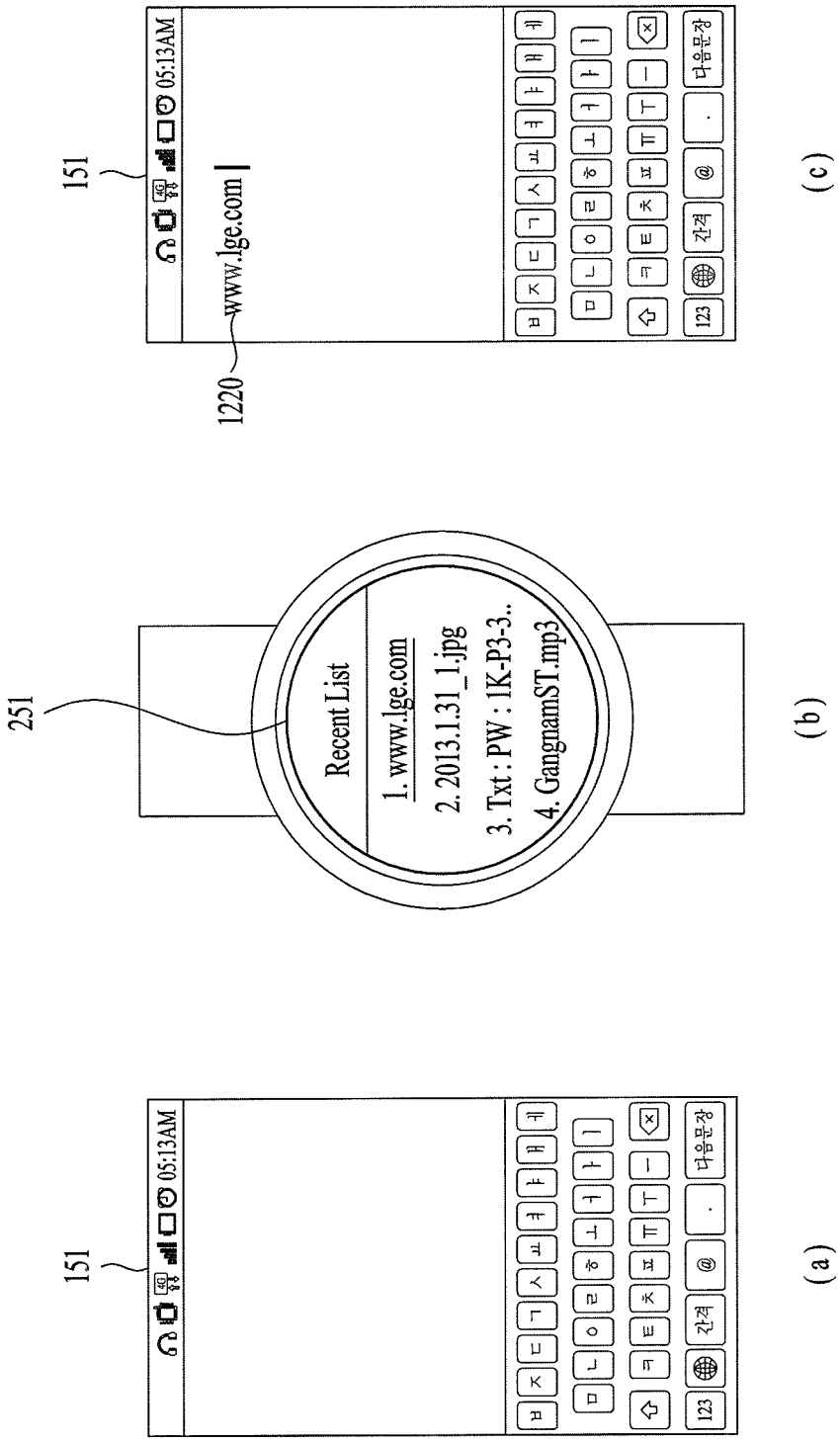
FIG. 12 is a diagram illustrating one example of a process for performing a clipboard list function in a watch type mobile terminal according to one embodiment of the present invention.

Referring to FIG. 12 (*a*), a virtual keypad for composing a message is displayed on the touchscreen 151. If there occurs a situation that a text, link, content and the like can be pasted on an input box (e.g., a situation that the virtual keypad is displayed), the controller 180 of the mobile terminal can inform the watch type mobile terminal of the situation occurrence. Further, the controller 180 can deliver a list of recently used or copied texts, links and/or contents to the watch type mobile terminal as well. In this situation, if a user inputs a gesture of a specific type (e.g., lifting or swinging the watch type mobile terminal) with the watch type mobile terminal, referring to FIG. 12 (*b*), a list of contents recently received from the mobile terminal can be displayed on the touchscreen 251 of the watch type mobile terminal. If a specific content is selected from the list through a touch input, a signal corresponding to the selected content can be transmitted to the mobile terminal. Hence, referring to FIG. 12 (*c*), it may bring an effect such that the selected content is pasted into the input box. Therefore, a user checks a list of recently copied or used contents and can then conveniently paste a prescribed content into a currently active input box.

Figure 13:
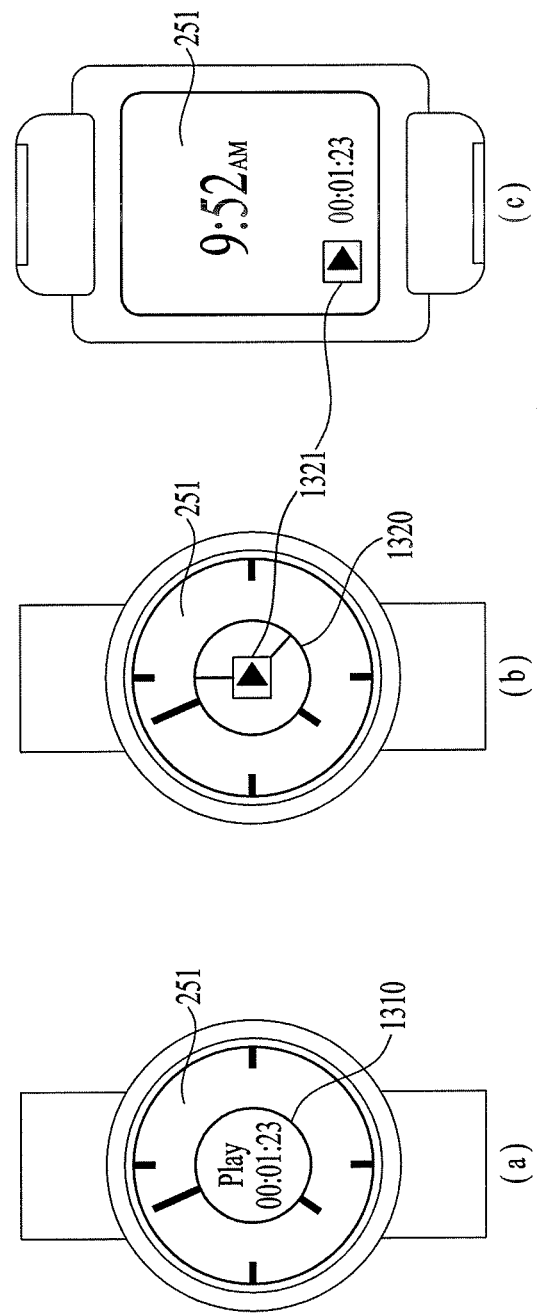
FIG. 13 is a diagram illustrating one example of a process for a watch type mobile terminal to display information for multimedia content currently being performed in a mobile terminal according to one embodiment of the present invention.

FIG. 13 is a diagram illustrating one example of a process for a watch type mobile terminal to display information of a multimedia content currently performed in a mobile terminal according to one embodiment of the present invention. Referring to FIG. 13 (*a*), while a watch of an analog type is displayed through a touchscreen 251 of a watch type mobile terminal, if a multimedia content is being played by a mobile terminal, information 1310 on a playtime of the content currently being played by the mobile terminal can be displayed on a center of the touchscreen 251. Of course, referring to FIG. 13 (*b*), the playtime can be displayed as a graph 1320. In particular, an icon 1321 corresponding to a play status (e.g., play, stop, fast rewind, etc.) can be displayed on a center of the graph and an icon of an application for playing multimedia contents can be displayed on the mobile terminal as well. When a watch of a digital type is displayed on the watch type mobile terminal, information on currently played content can be displayed as shown in FIG. 13 (*c*). Such a function is specifically useful if music is played while a display of the mobile terminal is turned off or a video is being watched in a full screen mode.

In addition, information on a playable time over a current remaining battery level can be displayed on the touchscreen 251 as well as the information on the playtime of the content. Recently, most communication service providers propose a payment system that provides a free-of-charge call time. Yet, in order to check a remaining call time in the course of making a phone call, it is inconvenient to check an application or widget provided by a communication service provider through the touchscreen 151. Although the free-of-charge call time has been checked before making a phone call, the free-of-charge call time is not updated by real time in the course of making the phone call. Therefore, according to the present embodiment, proposed is a method of displaying a remaining call time in the course of making a phone call by a user currently looking at a watch type mobile terminal.

Figure 14:
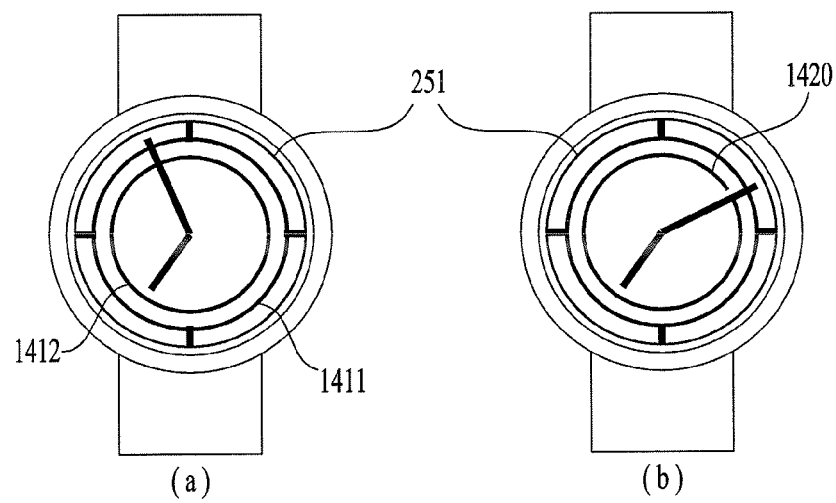
FIG. 14 is a diagram illustrating one example of a process for displaying a remaining call time in a watch type mobile terminal according to one embodiment of the present invention.

FIG. 14 is a diagram illustrating one example of a process for displaying a remaining call time in a watch type mobile terminal according to one embodiment of the present invention. Referring to FIG. 14, as a call is initiated, the controller 180 obtains a free-of-charge call time information through a communication service provider application and then delivers it to a watch type mobile terminal. Hence, referring to FIG. 14 (a), concentric circles 1411 and 1412 corresponding to remaining times can be displayed. Assuming that a single concentric circle amounts to 1 hour, FIG. 14 (a) shows a situation that a free-of-charge call time amounting to 2 hours remains. As the call proceeds, referring to FIG. 14 (b), a color of a part 1420 of an inner concentric circle corresponding to a trace of a minute hand starting with an initial call start point can be changed in real time. Hence, a user can check a remaining free-of-charge call time in real time by the number of circles and a rate of the color changed part of the corresponding circle.

Figure 15:
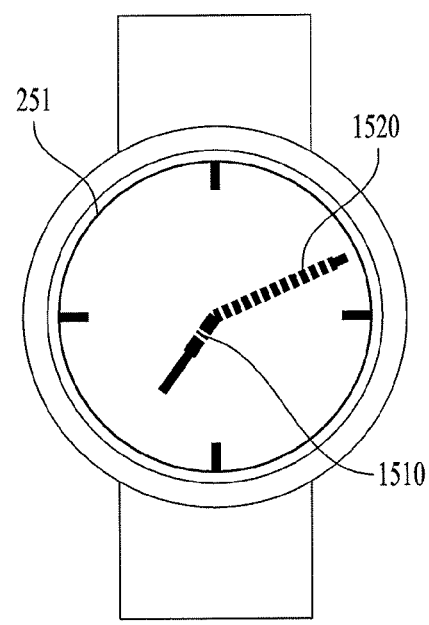
FIG. 15 is a diagram illustrating one example of a process for displaying a remaining battery level in a watch type mobile terminal according to one embodiment of the present invention.

FIG. 15 is a diagram illustrating one example of a process for displaying a remaining battery level in a watch type mobile terminal according to one embodiment of the present invention. Referring to FIG. 15, when a watch of an analog type is displayed through a touchscreen 251 of a watch type mobile terminal, a battery level can be displayed using internal color changes for hour and minute hands 1510 and 1520. For instance, if the hour hand corresponds to a mobile terminal and the minute hand corresponds to the watch type mobile terminal, a remaining battery level of the mobile terminal is about 50% and a remaining battery level of the watch type mobile terminal is about 80%.

In the following description, a method of displaying a content displayed in a mobile terminal as a processed shape in a watch type mobile terminal is explained in detail with reference to FIGS. 16 to 19. When finding directions, cooking a meal, following an exercise movement, or doing grocery shopping by reading a do-grocery list, a user may need to check content found/displayed in a mobile terminal repeatedly or periodically. Further, if a user's hands are not free, the user may have difficulty in checking a touchscreen of a mobile terminal. Thus, in order to solve a problem caused when a user sequentially checks content displayed on the touchscreen of the mobile terminal despite having difficulty in checking the touchscreen of the mobile terminal gripped with the user's hand, one embodiment of the present invention proposes a following method. First, information displayed on a mobile terminal is processed. Second, the processed information is displayed through a watch type mobile terminal. For clarity, such a function shall be named "watch scrap."

Figure 16:
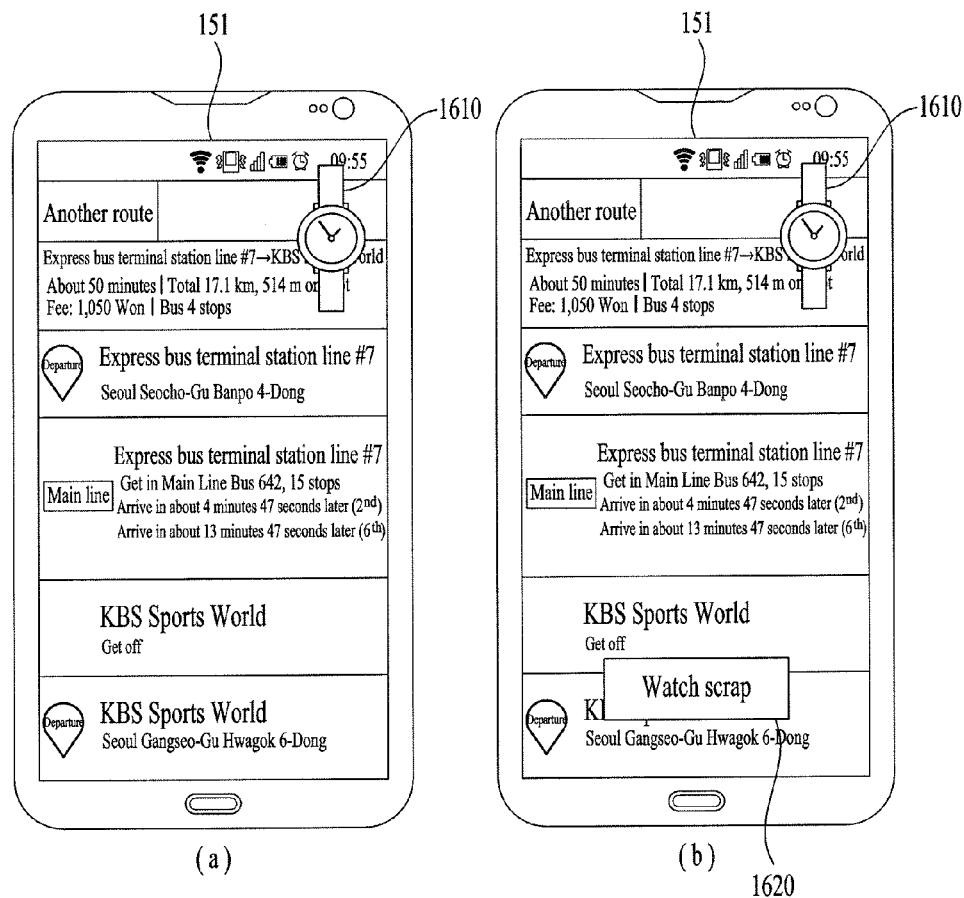
FIG. 16 is a diagram illustrating one example of a process for selecting content, which is to be displayed on a watch type mobile terminal, in a mobile terminal to activate a watch scrap function according to one embodiment of the present invention.

Thus, a method of transmitting content displayed on a mobile terminal to a watch type mobile terminal is required. Such a method is described in detail with reference to FIG. 16 as follows. FIG. 16 is a diagram illustrating one example of a process for selecting content, which is to be displayed on a watch type mobile terminal, in a mobile terminal to activate a watch scrap function according to one embodiment of the present invention.

Referring to FIG. 16 (a), while an application (e.g., a navigation application) configured to provide a watch scrap function is running, if the watch type mobile terminal is paired with the mobile terminal, a watch icon 1610 can be displayed on a prescribed region of the touchscreen. If the watch icon 1610 is selected, referring to FIG. 16 (b), it can output a message 1620 indicating that the watch scrap function is activated.

Once content to which the watch scrap function will be applied is determined, the controller 180 can divide the corresponding content by a size appropriate for displaying the content on the watch type mobile terminal. In performing the division, the controller 180 sorts scrapped content into multimedia content (e.g., image, video, etc.) and a text. In particular, a division reference of the text may be determined in accordance with a resolution of a touchscreen provided to a watch type mobile terminal, a font size, a sentence/paragraph and the like. If the multimedia content is not suitable for being displayed on the watch type mobile terminal, it can be converted to a text corresponding to a content file name.

All the divided information can be directly transmitted to the watch type mobile terminal. The divided information can be divided on a case by case basis and sequentially changed or displayed on the watch type mobile terminal.

Figure 17:
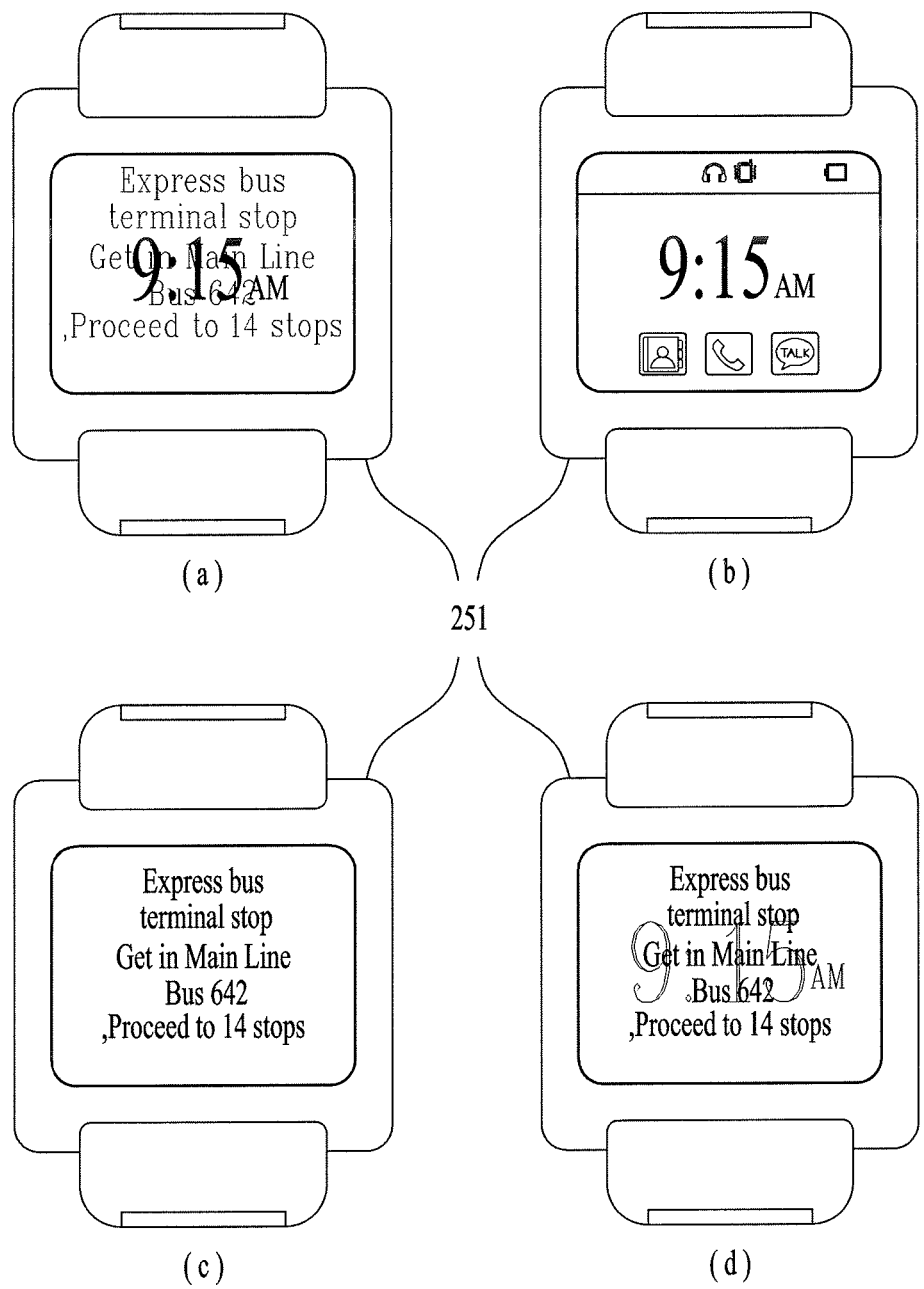
FIG. 17 is a diagram illustrating one example of a process for displaying scrapped content in a watch type mobile terminal according to one embodiment of the present invention.

In the following description, a process after selecting content to scrap from a mobile terminal is explained in detail with reference to FIG. 17. FIG. 17 is a diagram illustrating one example of a process for displaying a scrapped substance in a watch type mobile terminal according to one embodiment of the present invention. Referring to FIG. 17 (a), as content to be scrapped is determined in a mobile terminal, first information of a scrapped content, which is divided to a lower layer than previously displayed time information, can be semi-transparently displayed on a touchscreen 251 of a watch type mobile terminal. In this instance, the scrapped content can be directly displayed when division processing is completed in accordance with a determination of the content to be scrapped in the mobile terminal. Alternatively, after information indicating that a touchscreen of the mobile terminal is turned off has been transmitted from the mobile terminal to the watch type mobile terminal, if a user's specific gesture of lifting the watch type mobile terminal or the like is recognized, then the scrapped content can be displayed on the watch type mobile terminal.

Further, if the user wishes to use the watch type mobile terminal for a normal usage other than checking the scrapped content, the user can input a first gesture (e.g., a shaking action performed once in a left direction, etc.). Hence, referring to FIG. 17 (b), a home screen of the watch type mobile terminal can be displayed on the touchscreen 251. If the user intends to check the scrapped content, the user can input a second gesture (e.g., a shaking action performed once in a right direction, etc.). Hence, referring to FIG. 17 (c), a first part of the divided content can be displayed as a full screen on the touchscreen. Further, referring to FIG. 17 (d), the scrapped content can be displayed on an upper layer and a time can be semi-transparently displayed on a lower layer. Of course, the configuration shown in FIG. 17 (c) can be displayed first. Subsequently, the watch shown in FIG. 17 (d) can then be displayed only if an input schedule hour/event is imminent.

Figure 18:
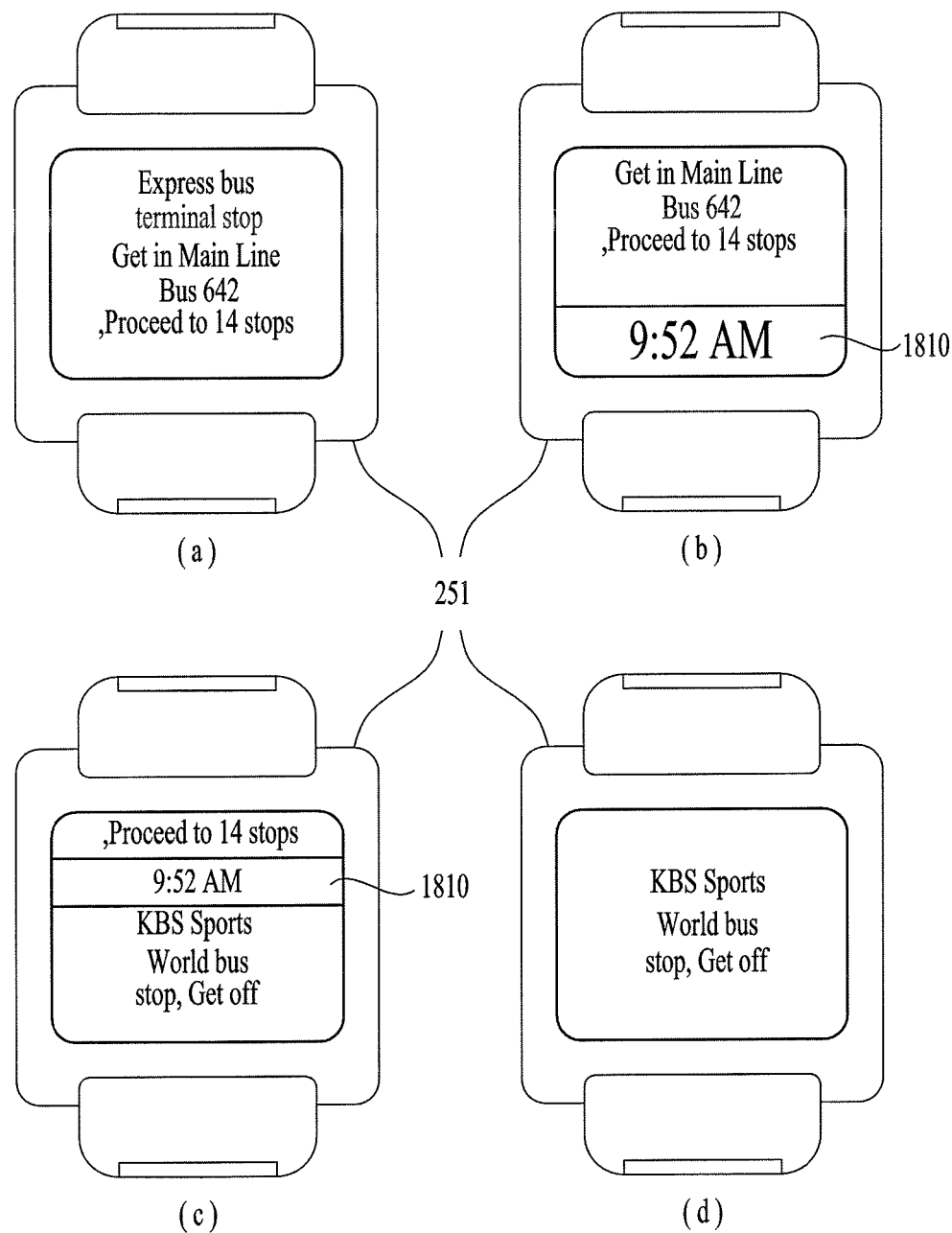
FIG. 18 is a diagram illustrating one example of a process for displaying scrapped content together with a time in a watch type mobile terminal according to one embodiment of the present invention.

In order to display a time, a method shown in FIG. 18 can be applied. FIG. 18 is a diagram illustrating one example of a process for displaying a scrapped content together with a time in a watch type mobile terminal according to one embodiment of the present invention. Referring to FIG. 18 (a), when a prescribed part of a divided scrapped content is displayed, if a user inputs a first gesture or a flicking touch in a first direction on a touchscreen, a next divided part of the scrapped content can be displayed by a scroll. Further, until the next divided part of the scrapped content is fully displayed (FIG. 18 (d)), current hour information 1810 can be scrolled together with the scrapped content by being included in the middle of the display (FIG. 18 (b), FIG. 18 (c)). Yet, if scrolling occurs frequently, the hour display is generated without an hour change, which might be useless or annoying. Hence, after hour information has been displayed one time, the hour information can be displayed in the middle of a scroll after a lapse of a predetermined period of time (e.g., 3 minutes). Meanwhile, if a user desires to display a previously divided content part again, the user may input a second gesture or a flicking touch in a second direction on the touchscreen.

Figure 19:
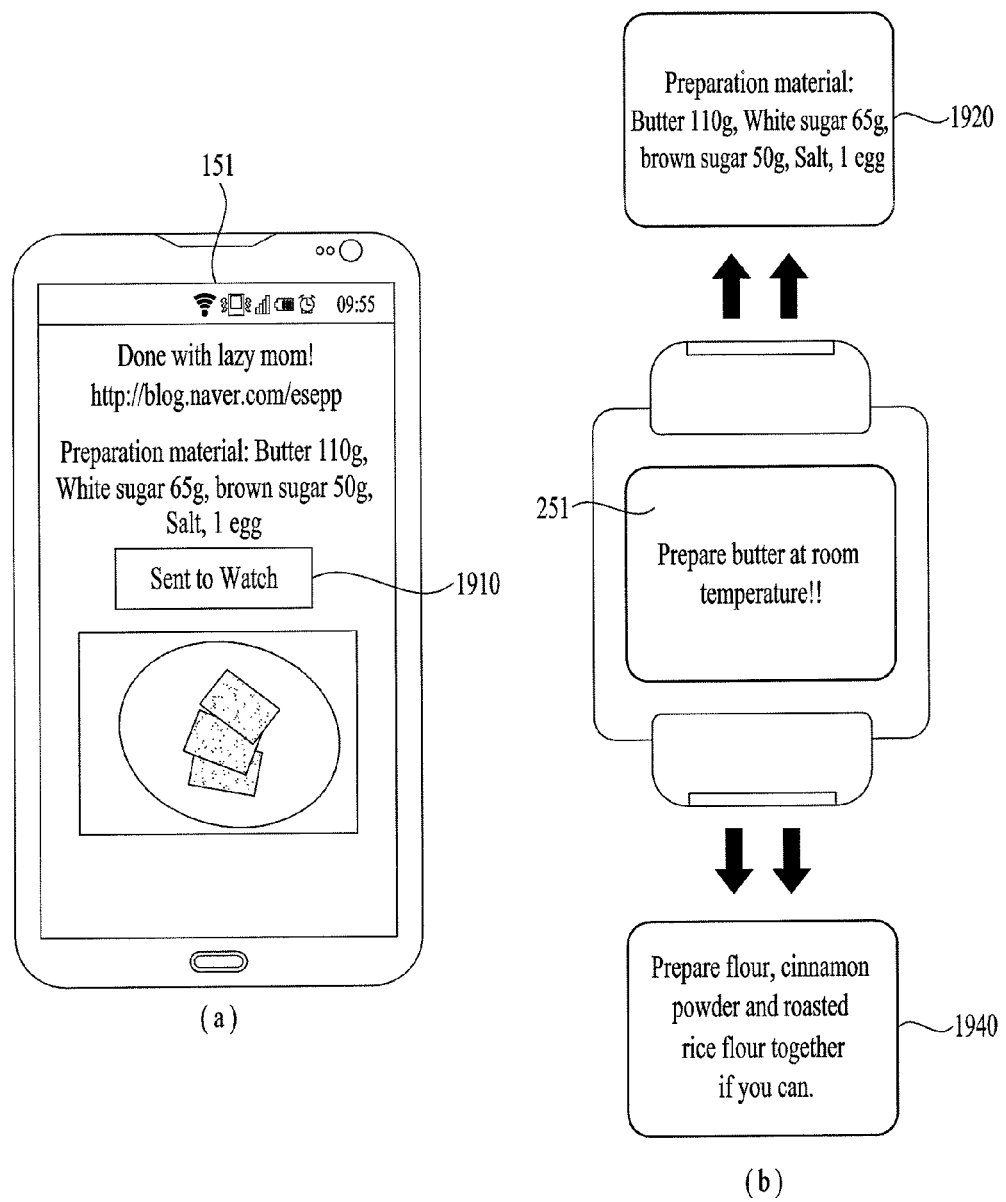
FIG. 19 is a diagram illustrating one example of a process for displaying a webpage, which is scrapped through a watch scrap function in a mobile terminal, by a watch type mobile terminal according to one embodiment of the present invention.

In the following description, a case of scrapping a webpage is described in detail with reference to FIG. 19. FIG. 19 is a diagram illustrating one example of a process for displaying a webpage, which is scrapped through a watch scrap function in a mobile terminal, by a watch type mobile terminal according to one embodiment of the present invention.

In FIG. 19, assume that a webpage disclosing a cooking recipe is currently displayed by a web browser running in a mobile terminal. While a user is cooking and reading the found recipe, since user's hands may not be clean during the cooking, the user may have difficulty in manipulating a touchscreen. In this instance, a watch scrap function according to the present embodiment may be especially useful. First of all, referring to FIG. 19 (a), when a webpage is displayed on a touchscreen 151 of a mobile terminal, if a user inputs a long touch to the touchscreen, a menu 1910 for activating a scrap function can be displayed. If the corresponding menu 1910 is selected, as mentioned in the foregoing description, the controller 180 divides full substance of the webpage by prescribed reference. Further, content other than text can be omitted. Hence, referring to FIG. 19 (b), the divided webpage content 1920, 1930 and 1940 can be sequentially displayed by a touchscreen 251 of a watch type mobile terminal by being scrolled in response to a touch input or gesture applied to the touchscreen 251.

Figure 20:
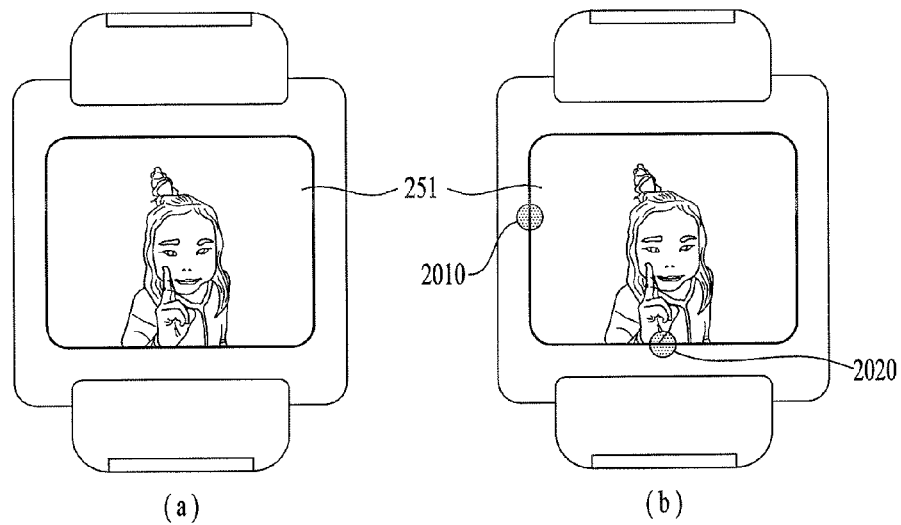
FIG. 20 and FIG. 21 are diagrams illustrating examples of a method of displaying a current hour with content as a full screen through a touchscreen of a watch type mobile terminal according to one embodiment of the present invention, respectively.
Figure 21:
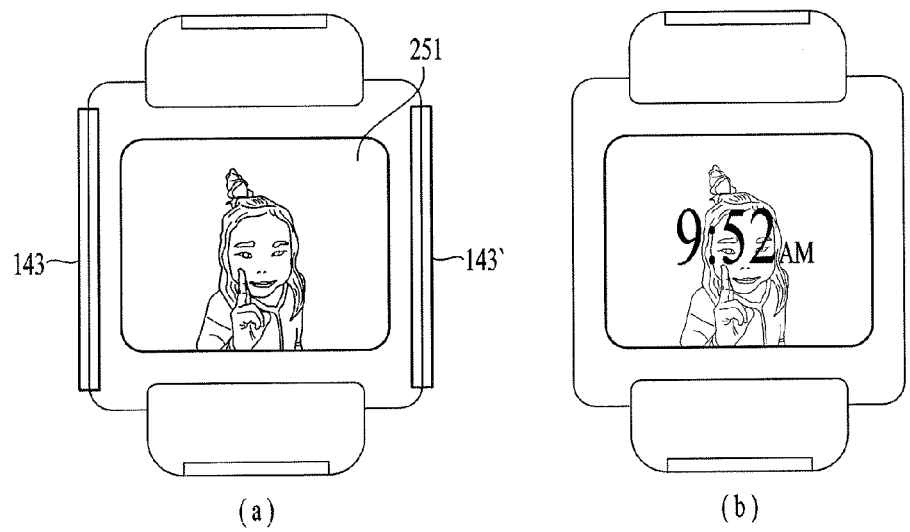

In the following description, a method of displaying different information as a full screen on a touchscreen of a watch type mobile terminal according to an embodiment of the present invention is explained in detail with reference to FIG. 20 and FIG. 21. FIG. 20 and FIG. 21 are diagrams illustrating examples of a method of displaying a current hour on displayed content as a full screen on a touchscreen of a watch type mobile terminal according to one embodiment of the present invention, respectively.

First of all, a watch type mobile terminal is preferably configured to enable a current time to always be checked due to its features. Yet, if an indicator region is displayed all the time, a screen area available for displaying content is reduced due to a limited size of a touchscreen. Hence, if content (e.g., an image, etc.) other than the time keeps being displayed during a predetermined time period in a watch type mobile terminal (FIG. 20 (a)), different colors/shapes can be displayed on an image edge region in an hour hand direction 2010 and a minute hand direction 2020 of an analog watch corresponding to a current hour, respectively. Through this, a user can check a current hour or time by synthesizing the types and locations of the colors as if looking at an analog watch.

Of course, a current hour can be displayed only when desired by a user. For instance, if pressure sensors 143 and 143' are arranged on both edges of a watch type mobile terminal (FIG. 21 (a)), when content is displayed as a full screen by the touchscreen 251, a current hour can be displayed semi-transparently by applying a pressure to the pressure sensor. In this instance, a level of semi-transparency may be proportional to a strength of the applied pressure.

According to the operations mentioned in the foregoing description, it is apparent to those skilled in the art that a watch type mobile terminal can operate by performing an input/output function (e.g., a function of receiving an input of a user's voice or detecting a gesture and then sending a corresponding result to a mobile terminal, a function of displaying an information received from the mobile terminal, etc.) in response to a command of a controller 180 of a mobile terminal. In addition, it is also apparent to those skilled in the art that a watch type mobile terminal can operate by performing a prescribed function by itself and then reporting a corresponding result to a mobile terminal.

Accordingly, the present invention provides the following effects and/or features. First of all, a mobile terminal interworks with a watch type mobile terminal, thereby providing various kinds of convenient functions. Second, in a situation that a user has difficulty checking a touchscreen of a mobile terminal, necessary information is processed into a form suitable for a watch type mobile terminal and then displayed conveniently to the user.

It will be apparent to those skilled in the art that various modifications and variations can be specified into other form(s) without departing from the spirit or scope of the inventions.

According to one embodiment of the present invention, the above-described methods can be implemented in a program recorded medium as processor-readable codes. The processor-readable media include all kinds of recording devices in which data readable by a processor can be saved. The processor-readable media can include ROM, RAM, CD-ROM, magnetic tapes, floppy discs, optical data storage devices, and the like for example and also include carrier-wave type implementations (e.g., transmission via Internet). In addition, the processor may include the controller 180 of the terminal.

The aforementioned embodiments are achieved by combination of structural elements and features of the present invention in a predetermined type. Each of the structural elements or features should be considered selectively unless specified separately. Each of the structural elements or features may be implemented without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a mobile terminal, the method comprising:
   executing, via a controller of the mobile terminal, a first function;
   receiving a first signal from a watch type mobile terminal while the mobile terminal is executing the first function;
   transmitting, via a wireless communication unit of the mobile terminal, information related to the first function to the watch type mobile terminal, in response to the receiving of the first signal;
   controlling the watch type mobile terminal to output the information related to the first function on the watch type mobile terminal;
   interrupting an execution of the first function and executing a second function on the mobile terminal, in response to an occurrence of an event related to the second function;
   transmitting information related to the second function to the watch type mobile terminal, in response to the interrupting the execution of the first function; and removing at least one portion of a user interface corresponding to the first function from a display of the mobile terminal, in response to the interrupting the execution of the first function.

2. The method of claim 1, wherein the first signal is received by the mobile terminal, in response to a specific motion gesture of the watch type mobile terminal.

3. The method of claim 1, wherein the information related to the first function comprises at least one of a time information of a content related to the first function, an information on a remaining battery level in accordance with the execution of the first function, a free-of-charge service time information of the first function, and an hour information configuring a user interface corresponding to the first function.

4. The method of claim 1, further comprising:
displaying a user interface of the first function including an input window, the information related to the first function comprises at least one of a text input to the input window, a multimedia content, and a web link.

5. The method of claim 4, further comprising:
receiving a second signal from the watch type mobile terminal; and
inputting information related to the first function and corresponding to the second signal to the input window.

6. The method of claim 1, further comprising:
dividing the information into part contents; and
sequentially displaying the part contents by the watch type mobile terminal.

7. A mobile terminal comprising:
a display;
a wireless communication unit configured to exchange signals with a watch type mobile terminal; and
a controller configured to:
execute a first function,
receive a first signal from the watch type mobile terminal while executing the first function,
transmit information related to the first function to the watch type mobile terminal to output the information related to the first function on the watch type mobile terminal,
interrupt the execution of the first function and execute a second function, in response to an occurrence of an event related to the second function,
transmit information related to the second function to the watch type mobile terminal, in response to the interrupting the execution of the first function, and
remove at least one portion of a user interface corresponding to the first function from the display of the mobile terminal, in response to an interruption of the execution of the first function.

8. The mobile terminal of claim 7, wherein the first signal is received, in response to a specific motion gesture of the watch type mobile terminal.

9. The mobile terminal of claim 7, wherein the information related to the first function comprises at least one of a time information of a content related to the first function, an information on a remaining battery level in accordance with the execution of the first function, a free-of-charge service time information of the first function, and an hour information configuring a user interface corresponding to the first function.

10. The mobile terminal of claim 7, wherein the controller is further configured to:
display a user interface of the first function including an input window, the information related to the first function comprises at least one of a text input to the input window, a multimedia content, and a web link.

11. The mobile terminal of claim 10, wherein the controller is further configured to:
receive a second signal from the watch type mobile terminal, and
input the information related to the first function and corresponding to the second signal to the input window, in response to receiving the second signal.

12. The mobile terminal of claim 7, wherein the controller is further configured to divide the information into multiple part contents to be sequentially displayed by the watch type mobile terminal.

13. A watch type mobile terminal comprising:
a touch screen display;
a wireless communication unit configured to exchange signals with a mobile terminal; and
a controller configured to:
recognize a predetermined event while the mobile terminal is executing a first function and displaying a user interface of the first function including an input window,
transmit a first signal to the mobile terminal in response to the predetermined event,
receive information related to the first function from the mobile terminal, wherein the information related to the first function comprises at least one of a text input to the input window, a multimedia content, and a web link,
display the information related to the first function on the touch screen display, and
transmit to the mobile terminal a second signal corresponding to one of the received information related to the first function, such that the information corresponding to the second signal is input to the input window in response to the transmitted second signal.

14. The watch type mobile terminal of claim 13, wherein the information related to the first function is displayed with a current time.

15. The watch type mobile terminal of claim 13, wherein the predetermined event is at least one of a predetermined motion of the watch type mobile terminal corresponding to a specific gesture and a voice command.

16. The watch type mobile terminal of claim 13, wherein the information is divided into part contents and the controller is further configured to sequentially display the part contents on the touch screen display of the watch type mobile terminal.

* * * * *